United States Patent
Liubinskas et al.

(10) Patent No.: US 11,032,793 B2
(45) Date of Patent: Jun. 8, 2021

(54) PROCESSING PAGING REQUESTS MESSAGES IN A WIRELESS COMMUNICATION SYSTEM

(71) Applicant: NetScout Systems, Inc, Westford, MA (US)

(72) Inventors: Tauras Liubinskas, Lexington, KY (US); Brandon Wayne Bass, Flower Mound, TX (US); Abhishek Saraswati, Santa Clara, CA (US)

(73) Assignee: NetScout Systems, Inc, Westford, MA (US)

( * ) Notice: Subject to any disclaimer, the term of this patent is extended or adjusted under 35 U.S.C. 154(b) by 71 days.

(21) Appl. No.: 16/689,973

(22) Filed: Nov. 20, 2019

(65) Prior Publication Data

US 2021/0112523 A1 Apr. 15, 2021

Related U.S. Application Data

(60) Provisional application No. 62/913,507, filed on Oct. 10, 2019.

(51) Int. Cl.
*H04W 76/12* (2018.01)
*H04W 76/25* (2018.01)
(Continued)

(52) U.S. Cl.
CPC ........... *H04W 68/005* (2013.01); *H04W 8/08* (2013.01); *H04W 24/08* (2013.01); *H04W 76/11* (2018.02)

(58) Field of Classification Search
CPC ... H04W 76/12; H04W 76/25; H04W 52/022; H04W 52/0264
(Continued)

(56) References Cited

U.S. PATENT DOCUMENTS

| 5,519,780 A | * | 5/1996 | Woo | ........................ | H04N 7/025 348/467 |
| 2010/0150049 A1 | * | 6/2010 | Kim | ...................... | H04W 76/12 370/312 |

(Continued)

FOREIGN PATENT DOCUMENTS

EP 3478007 B1 * 8/2016

OTHER PUBLICATIONS 802.15.1-2005—IEEE Standard for Information technology—Local and metropolitan area networks—Specific requirements—Part 15.1a: Wireless Medium Access Control (MAC) and Physical Layer (PHY) specifications for Wireless Personal Area Networks (WPAN) Jun. 2005 (Year: 2005).*

*Primary Examiner* — William D Cumming
(74) *Attorney, Agent, or Firm* — Locke Lord LLP; Scott D. Wofsy; Christopher J. Capelli

(57) ABSTRACT

A network node device in a communication system in which a data packet stream is received in the network monitoring node device having a Paging Message packet that is sent from a network node device. The identity of a User Equipment (UE) associated with the received Paging Message packet is then determined. A determination is then made if Paging Message information associated with the determined UE is stored in memory associated with the network monitoring device, whereupon the received Paging Message packet is filtered from the received data packet stream in the event previous Paging Message information was determined to be associated with the determined UE device in the memory. Additionally, Paging Message information is stored in the memory in the event there are no Paging Message packets stored in the memory associated with the determined UE device.

20 Claims, 5 Drawing Sheets

(51) Int. Cl.
   *H04W 68/00* (2009.01)
   *H04W 76/11* (2018.01)
   *H04W 8/08* (2009.01)
   *H04W 24/08* (2009.01)

(58) Field of Classification Search
   USPC .......................................... 455/419; 370/312
   See application file for complete search history.

(56) References Cited

U.S. PATENT DOCUMENTS

| | | | |
|---|---|---|---|
| 2014/0194111 A1* | 7/2014 | Aso ................... | H04W 52/0264 455/419 |
| 2018/0077682 A1* | 3/2018 | Li ...................... | H04W 52/0222 |
| 2020/0107293 A1* | 4/2020 | Cui ...................... | H04W 76/25 |

* cited by examiner

PROCESSING PAGING REQUESTS MESSAGES IN A WIRELESS COMMUNICATION SYSTEM

CROSS REFERENCE TO RELATED APPLICATIONS

This application claims priority to U.S. Patent Application Ser. No. 62/913,507 filed Oct. 10, 2019 which is incorporated herein by reference in its entirety.

FIELD OF THE INVENTION

The disclosed embodiments generally relate to wireless communication systems and, in particular, to a method and apparatus for processing Paging Request messages in a wireless communication system.

BACKGROUND OF THE INVENTION

Paging in a wireless communication system, such as VoLTE, is to be understood to be a mechanism to initiate services for User Equipment devices (UEs) (e.g., a smart phone) that are in idle mode. Idle mode transition is important to conserve battery of the UEs. If a UE is in connected mode and it has no data to send or receive, then an eNodeB (eNB) waits for a specific timer (UE Inactivity Timer) and once that timer expires, the eNB sends the UE to idle mode. This is typically accomplished by sending a Radio Resource Control (RRC) Release message to the UE. It is to be further understood a procedure needs to be defined to access the UEs in idle mode if there is downlink data for them. This process is the paging mechanism. Essentially, paging is mostly a RRC procedure that wakes up the UE which is Idle, if there is some data for it. Reasons for waking up a UE include the presence of downlink data, change of system information or even providing dangerous weather or other impending dangerous information—thus the UE needs to be woken up in case it has entered a RRC IDLE state.

As Mobile Providers introduce VoLTE, the need to have good responsiveness to calls requires that the caller's UE be expeditiously located in the network. As mentioned above, if a UE is not currently active in a session, a page request message is sent to the network to locate the UE. The page request message may be sent to the last known last tracking area in a network (e.g., an eNodeB) or to all tracking areas in a network (e.g., all eNodeBs). Typically if a Service Request message responsive to a Paging Request message is not sent back from a UE from a last known tracking network tracking area (e.g., a eNodeb), the Paging Request message is then broadcast to all tracking areas in the network (e.g., all eNodeBs). However, when the Paging Request message is broadcast to all known network tracking areas, a number of certain network disadvantages arise, including (but not limited to): the storage (memory) of the network monitoring devices receiving the broadcast Paging Request messages become flooded thus causing data packets to be dropped; the overall system performance of the network monitoring device is degraded due to the additional processing burden placed upon it by the broadcast Paging Request messages.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a network device in a communication system is described in which a data packet stream is received in the network device having a Paging Message packet that is sent from a network node device. The identity of a User Equipment (UE) associated with the received Paging Message packet is then determined. A determination is then made if Paging Message information associated with the determined UE is stored in memory associated with the network monitoring device, whereupon the received Paging Message packet is filtered from the received data packet stream in the event previous Paging Message information was determined to be associated with the determined UE device in the memory. Additionally, Paging Message information is stored in the memory in the event there are no Paging Message packets stored in the memory associated with the determined UE device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
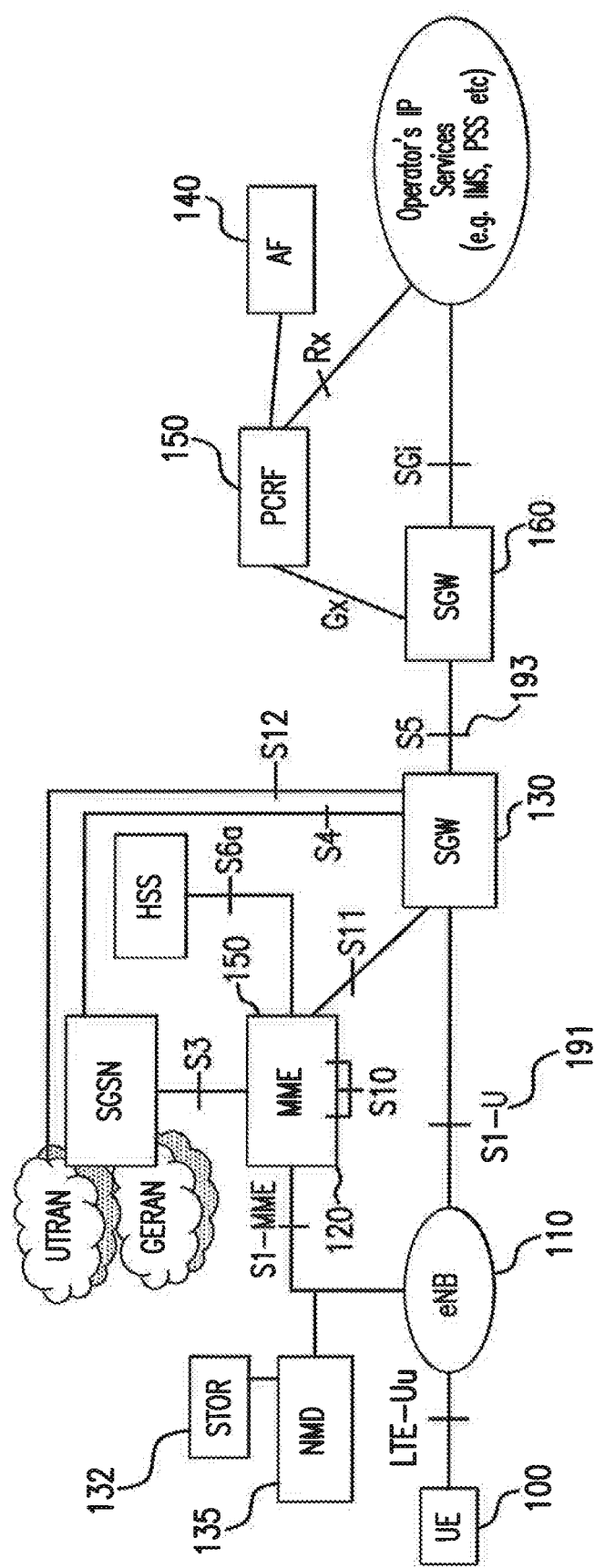
FIG. 1 is a diagram illustrating a LTE mobile communication system, components of which are used in the illustrated embodiments.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

With reference to FIG. 1, shown is a diagram illustrating a LTE mobile communication system. The radio access network of the LTE mobile communication system includes a next generation base station (hereinafter, referred to interchangeably as Evolved Node B (eNB), E-UTRAN, and Node B) 110, a Mobility Management Entity (MME) 120, and aServing Gateway (SGW) 130. The User Equipment (UE) 100 connects to an external network via the eNB, the SGW, and a PDN-Gateway (PGW). In accordance with the illustrated embodiments, a network monitoring device 135 is shown coupled to the S1-MME interface for receiving packets transmitted from the MME 150. It is to be appreciated that the network monitoring device 135 is preferably a standalone network device configured and operable to provide passive and non-disruptive monitoring of network packets over the S1-MME interface, a non-limiting example being the nGeniusONE™ commercially available from NETSCOUT™. Alternatively, another non-limiting example of such a network nodal device 135 may include an nGenius™ packet flow switch (PFS) also commercially available from NETSCOUT™

The eNB 110 is a Radio Access Network (RAN) node and corresponds to the BSC of the UTRAN system and the BSC of the GERAN system. The eNB 110 is connected with the UE 100 through a radio channel and performs operations similar to those of the legacy RNC/BSC. The eNB may use a plurality of cells simultaneously.

In LTE, all of the user traffics including real time service such as Voice over Internet Protocol (VoIP) are provided through a shared channel, and thus there is a need of an entity responsible for collecting status information of the UEs and scheduling based thereon such as eNB. The MME 120 is typically responsible for various control functions, and a plurality of eNBs may connect to one MME. It is to be understood the the SGW 130 is an entity for providing data bearer which is established or released under the control of the MME 120. It is to be further understood that the Application Function (AF) 140 is an entity for exchanging application information with the user at the application level.

The Policy Charging and Rules Function (PCRF) is an entity for controlling policy related to Quality of Service (QoS) of the user and transfers Policy and Charging Control (PCC) rule corresponding to the policy to the PGW 160. The PCRF 150 is an entity of controlling the QoS and billing for traffic. Meanwhile, the term "UP" denotes the paths connecting between the UE 100 and the RAN node 110, between the RAN node and the SGW 130, and the SGW 130 and the PGW 160 for data transmission. Among them, the path between the UE 100 and the RAN node 110 is a radio channel which is most resource-restrictive.

In the radio communication system such as LTE, QoS is applied per Evolved Packet System (EPS) bearer. An EPS bearer is used to transmit the IP flows requiring the same QoS. The EPS bearer may be designated parameters related to QoS such as QoS Class Identifier (QCI) and Allocation and Retention Priority (ARP). The QCI is a parameter defined as an integer indicating QoS priority, and the ARP is a parameter for use in determining whether to accept or reject new EPS bearer establishment.

The EPS bearer corresponds to the Packet Data Protocol (PDP) context of the General Packet Radio Service (GPRS). An EPS bearer belongs to a PDN connection which has the Access Point Name) as an attribute. In the case that a PDN connection for IP multimedia Subsystem (IMS) service such as Voice over LTE (VoLTE), the corresponding PDN connection is established using the well-known IMS APN.

In order to support voice telephony in the LTE network, it is possible to use the Packet Switched (PS) mode IMS-based VoLTE or the CS Fall Back (CSFB) reusing the Circuit Switched (CS) mode of the $2^{nd}$ Generation/$3^{rd}$ Generation (2G/3G) system. VoLTE is the term which can be used in the same concept as Voice over IMS (VoIMS).

In the case that the UE is in the idle mode, if downlink data or a mobile terminating call addressed to the UE occurs, a paging message is transmitted to notify the UE of the presence of data (or call setup) to receive. Since the paging resource available in one cell is limited, paging messages for plural UEs are crowded, it may occur to transmit the paging messages for part of the UEs due to the restricted paging resource. The voice telephony is a service very sensitive to delay and thus, if the paging signal transmission delay or drop occurs due to the paging channel congestion, the sensible service quality degrades significantly. Thus, and as mentioned above, when the Paging Request message is broadcast to all know network tracking areas, a number of certain network disadvantages arise, including (but not limited to): the storage (memory) of the network monitoring devices receiving the broadcast Paging Request messages become flooded thus causing data packets to be dropped; the overall system performance of the network monitoring device is degraded due to the additional processing burden placed upon it by the broadcast Paging Request messages.

In accordance with an illustrated embodiment, described is an apparatus and/or method which may be in nodal devices such as switches, probes and any other device of FIG. 1 that requires a Paging Message or Paging-like message to be removed from a S1AP paging packet stream while allowing a key message so as to continue to provide the functionality that is required for the user. As is known, the S1 Application Protocol (S1AP) provides the control plane signaling between E-UTRAN and evolved packet core (EPC). The used interface is S1-MME which is located between eNB and MME. The services provided by the S1AP are divided to UE associated and non UE associated.

For ease of description purposes, such a nodal device that may provide the functionality in accordance with the illustrated embodiment is to be referred to as network monitoring nodal device implemented in the communication network of FIG. 1. Such as network monitoring nodal device may consist of one or more of the following: network switches, packet flow switches (PFS) and taps, probes and any other device that requires paging messages or paging like messages removed from a S1AP paging packet data stream, but while allowing passage of other key messages for preserving in a network monitoring device the intended functionality that is required for the user. For instance, such as network monitoring device also preferably provides Key Performance Indicator (KPI) functionality. For ease of description purposes, the network monitoring device used in the below description is to be understood to be network monitoring device 135 shown coupled to S1-MME interface between eNodeB 110 and MME 150 in FIG. 1, but as mentioned above, is not to be understood to be limited thereto.

The removal of the Paging Message or Paging-like message (paging messages) in a network monitoring device 135 according to an illustrated embodiment is preferably accomplished using a filtering device/mechanism operative and configured to filter out paging messages for a specific UE device 100 subsequent to receipt of an initial paging message for that UE device 100 if no responsive Service Request message was sent from the UE device 100. As explained below, the aforesaid subsequent paging messages received in the network monitoring device 135 are filtered out (e.g., dropped) preferably until a predetermined period of time or until a Service Request message is sent from the UE device 100, preferably whichever occurs first.

Figure 2:
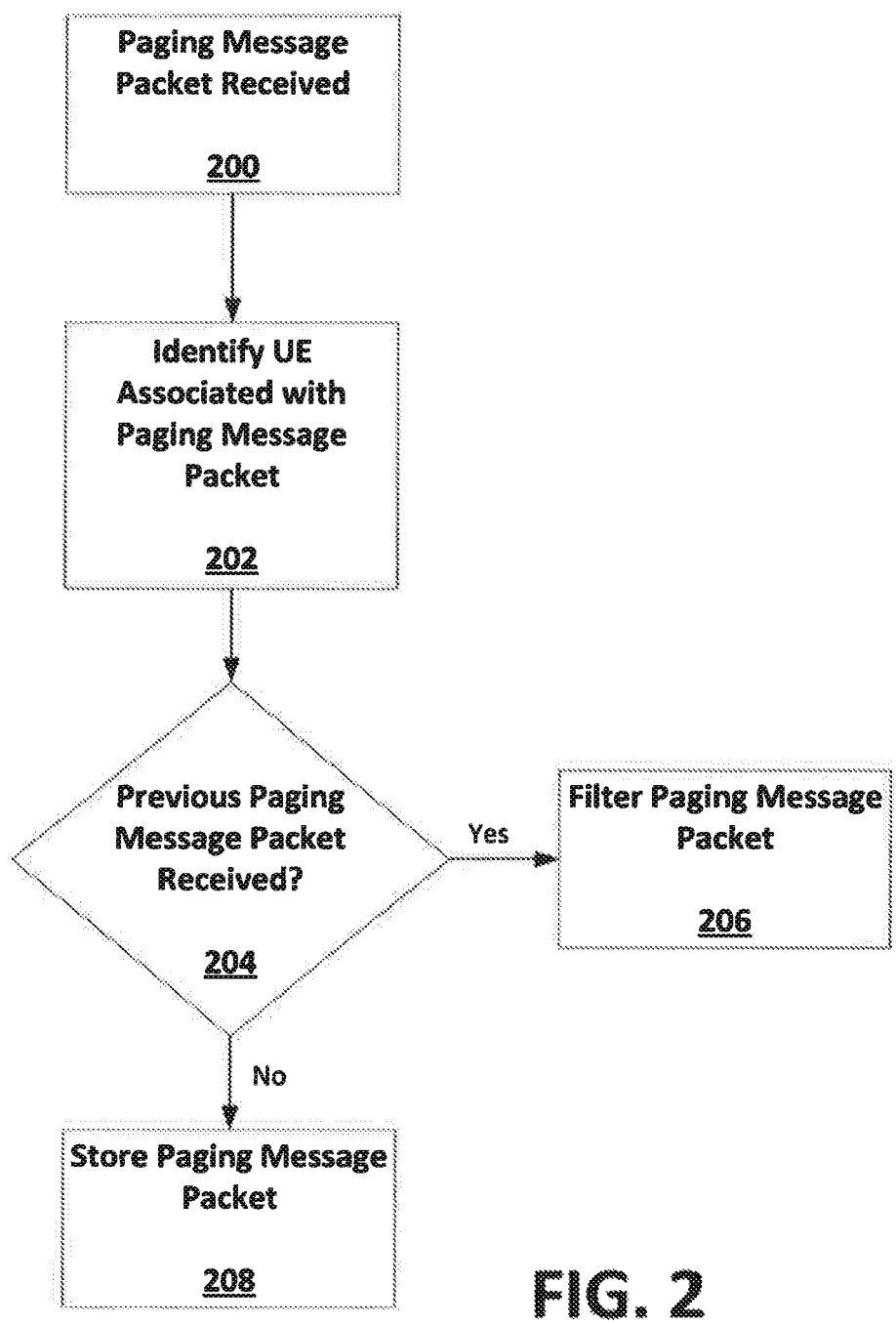
FIGS. 2-4 are flow charts depicting certain operational steps of a network device in the communication system of FIG. 1 in accordance with the illustrated embodiments.

With reference now to FIG. 2, the process for filtering paging messages in a network monitoring device 135 implemented in the communications network of FIG. 1 is now described. Upon receipt of a paging message in a network monitoring 135 (step 200), the network monitoring device 135 is configured and functional to identify the UE device 100 associated with the received paging message (preferably in a frontend processing portion of the network monitoring 135) (step 202). Preferably, this is accomplished in the network monitoring device 135 by extracting unique keys present the paging massage (such as MME Mobile Subscriber Identity and MME codes), which unique keys specifically identifies the UE device 100.

Once the UE device 100 is identified (step 202), a determination is made as to whether a paging message has already been received (preferably within a predetermined period of time) for the identified UE device 100 (step 204). This is preferably accomplished with reference to a memory/storage device 132 associated with the network monitoring device 135. If yes (a paging message for a given UE device 100 has been received), then the received paging message is filtered out (dropped), preventing any further processing and/or storage of the paging message in the network monitoring device 135 (step 206). Thus, no processing and/or storage entities of the network monitoring device 135 are consumed regarding the now filtered paging message.

If no (a paging message for a given UE device 100 has not been received), preferably within a predetermined period of time (as discussed further below) for the determined UE device 100, then the received paging message (along with the determined identity of the associated UE device 100) is preferably stored in the storage device 132 associated with network monitoring device 135, which storage device 132 may have a lookup table format (step 208).

Figure 3:
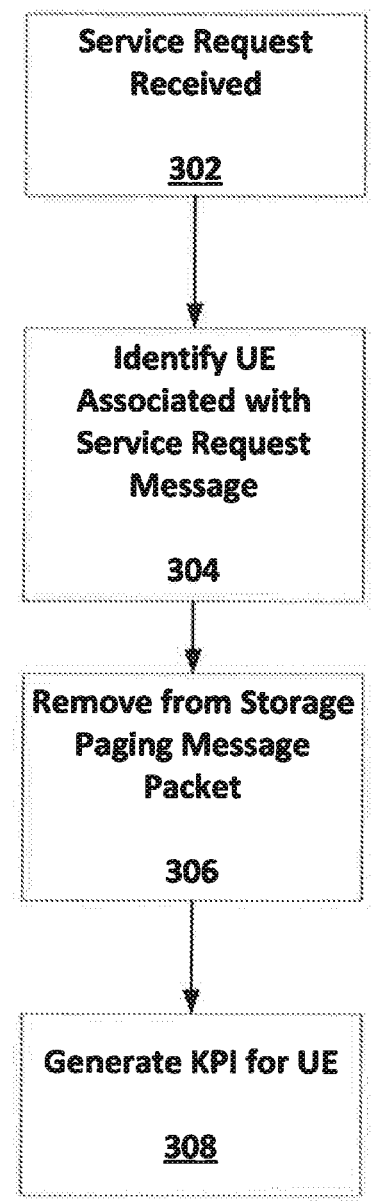

With reference now to FIG. 3, when a Service Request message (responsive to a paging message) from a UE device 100 is received in the network monitoring device 135 (step 302), the network monitoring device 135 is preferably configured and functional to identify the UE device 100 associated with the received Service Request message (preferably in a frontend processing portion of the network monitoring device) (step 304). As mentioned above in regards to a received paging message (step 202), preferably this is accomplished in the network monitoring device 135 by extracting unique keys present the Service Request message (such as MME Mobile Subscriber Identity and MME codes), which specifically identifies the UE device 100. Once the identity of the UE device 100 has been determined, information regarding the associated paging message as stored by the monitoring device 135 (preferably in a tracking table) is then parsed (removed) from the storage device 132 of the network monitoring device 135 (step 306). It is to be appreciated that the network monitoring device 135 may then be further configured to generate a Key Performance Indicator (KPI) for the given UE device 100 (step 308)

Figure 4:
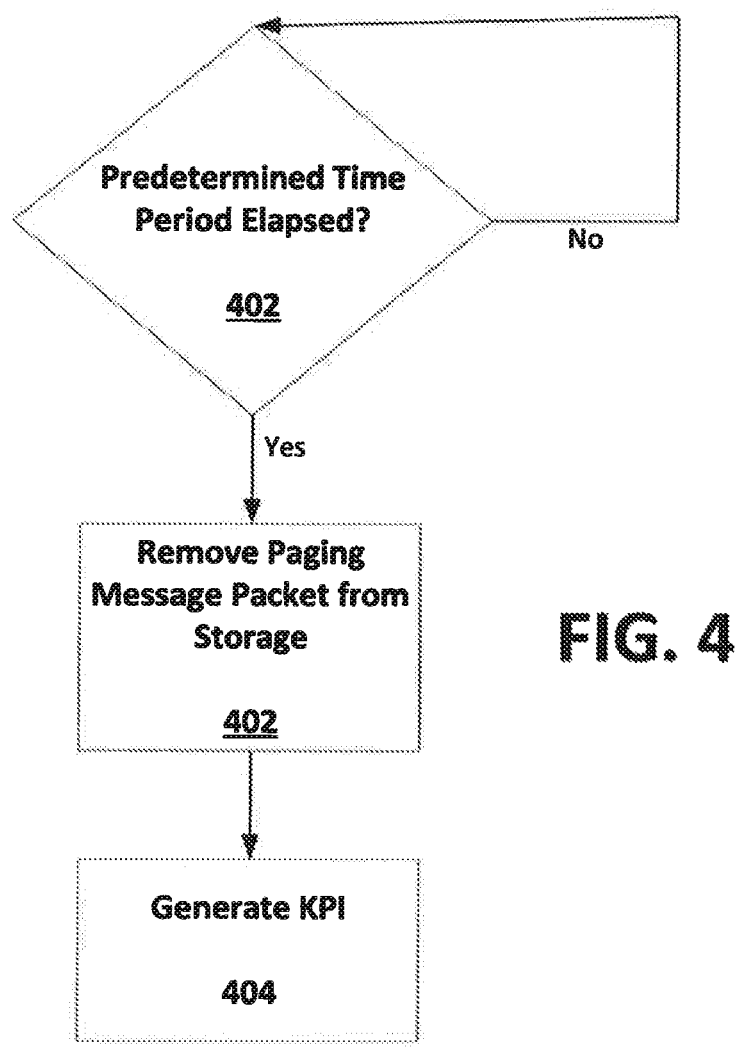

With reference now to FIG. 4, and with regards to the above mentioned predetermined time period, starting at step 402, the network monitoring device 135 is further configured and operational to determine if a predetermined time period has elapsed for a paging message stored in the storage device 132 of the network monitoring 135 (which predetermined time period commenced once the paging message for an identified UE device 100 is stored in the storage device 132 of network monitoring device 135 (step 208)). If yes, then the stored paging message for an identified UE device 100 is parsed (removed) from the storage device 132 of network monitoring 135 (step 402). The network monitoring device 135 may then be configured to generate a KPI for the UE device 100 (step 404). It is to be appreciated that if another subsequent paging message is received for that given UE device 100, then it is to be once again stored in the storage device 132 of network monitoring device 135 in accordance with above described process of FIG. 2 (steps 200-208).

Therefore, it is to be appreciated that a paging message for a given UE device 100 is parsed (removed) from the storage device 132 of network monitoring device 135 if: 1) a Service Request message (responsive to a paging message) from the given UE device 100 is received in the network monitoring device 135; or 2) upon expiration of the predetermined time period for a paging message stored in the storage device 132 of network monitoring device 135, as mentioned above. Thus, in accordance with the illustrated embodiments, an improvement is clearly provided in that a network monitoring device 135 preserves its optimal operating efficiency by avoiding unnecessary usage of its processing entities and/or storage constraints by filtering Paging Message packets received subsequent to an initial active session Paging Message for a given UE device.

Figure 5:
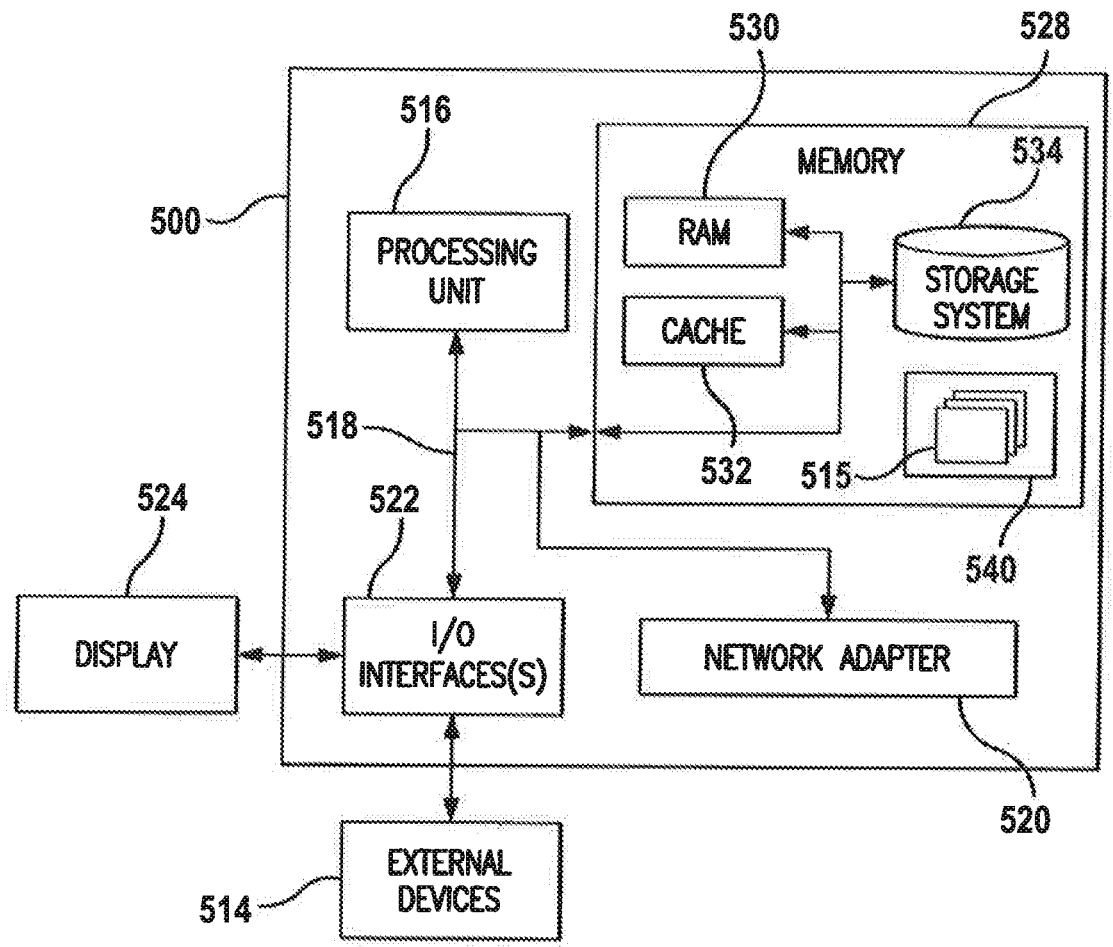
FIG. 5 illustrates an example network node device components of which are used in a network device of FIG. 1 in accordance with the illustrated embodiments.

With reference now to FIG. 5, shown is a schematic block diagram of an example network computing device 500 that may be used (or components thereof) with one or more embodiments described herein, including network monitoring device 135. As explained above, in different embodiments these various devices are configured to communicate with each other in any suitable way, such as, for example, via a communication network.

Device 500 is intended to represent any type of computer system capable of carrying out the teachings of various embodiments of the present invention. Device 500 is only one example of a suitable system and is not intended to suggest any limitation as to the scope of use or functionality of embodiments of the invention described herein. Regardless, computing device 500 is capable of being implemented and/or performing any of the functionality set forth herein.

Computing device 500 is operational with numerous computing system environments or configurations. Examples of well-known computing systems, environments, and/or configurations that may be suitable for use with computing device 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 500 may be described in the general context of a special purpose computer system having executable instructions, such as program modules, being executed by a computer system. Generally, program modules may include routines, programs, objects, components, logic, data structures, and so on that perform particular tasks or implement particular abstract data types. Computing device 500 may be practiced in distributed data processing environments where tasks are performed by remote processing devices that are linked through a communications network. In a distributed data processing environment, program modules may be located in both local and remote computer system storage media including memory storage devices.

Device 500 is shown in FIG. 2 in the form of a special purpose computing device for providing the functionality of network monitoring device 135 as described herein. The components of device 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 500 typically includes a variety of computer system readable media. Such media may be any available media that is accessible by device 500, and it includes both volatile and non-volatile media, removable and non-removable media.

System memory 528 can include computer system readable media in the form of volatile memory, such as random access memory (RAM) 530 and/or cache memory 532. Computing device 500 may further include other removable/non-removable, volatile/non-volatile computer system storage media. By way of example only, storage system 534 can be provided for reading from and writing to a non-removable, non-volatile magnetic media and/or Solid State Drives (SSD) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as underwriting module, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Device 500 may also communicate with one or more external devices 514 such as a keyboard, a pointing device, a display 524, etc.; one or more devices that enable a user to interact with computing device 500; and/or any devices (e.g., network card, modem, etc.) that enable computing device 500 to communicate with one or more other computing devices. Such communication can occur via Input/Output (I/O) interfaces 522. Still yet, device 500 can communicate with one or more networks such as a local area network (LAN), a general wide area network (WAN), and/or a public network (e.g., the Internet) via network adapter 520. As depicted, network adapter 520 communicates with the other components of computing device 500 via bus 518. It should be understood that although not shown, other hardware and/or software components could be used in conjunction with device 500. Examples, include, but are not limited to: microcode, device drivers, redundant processing units, external disk drive arrays, RAID systems, tape drives, and data archival storage systems, etc.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method by a network device in a communication system for filtering paging messages in a data packet stream associated with a UE device, the method comprising:
    receiving a data packet stream having a Paging Message packet from a network node device in the communication system;
    determining an identity of a User Equipment (UE) associated with the received Paging Message packet;
    determining if Paging Message information associated with the determined UE is stored in memory; and
    filtering the received Paging Message packet from the received data packet stream in the event stored Paging Message information was determined to be associated with the determined UE;
    storing information associated with the received Paging Message packet in the memory in the event there is no Paging Message information stored in the memory associated with the determined UE;
    determining if a predetermined time period has elapsed for storage in the memory of Paging Message information associated with the determined UE; and
    removing the information associated with Paging Message packet from the memory in the event the predetermined time period has elapsed.

2. The method as recited in claim 1, further including generating a Key Performance Indicator (KPI) in the event the received Paging Message packets is for a same UE associated with previous received Paging Message packets when no Service Requests were received after the predetermined time period has elapsed for the same UE.

3. The method as recited in claim 1, further including the steps:
    receiving a Service Request message in the received data stream packet from a network node device in the communication system;
    determining an identity of a User Equipment (UE) associated with the received Service Request message;
    determining if Paging Message information associated with the determined UE is stored in memory; and
    removing the stored Paging Message information associated with the determined UE device from the memory.

4. The method as recited in claim 3, further including generating a Key Performance Indicator for the determined UE in the event a Paging Message information associated with the determined UE was removed from the memory.

5. The method as recited in claim 1, wherein the information associated with the received Paging Message packet in the memory includes MME Mobile Subscriber Identity information.

6. The method as recited in claim 1, wherein the received Paging Message packet is a downlink S1AP Paging Message packet.

7. The method as recited in claim 1, when the identity of a User Equipment (UE) associated with the received Paging Message packet message is determined by analysis of unique keys present the received data packet stream.

8. The method as recited in claim 1, when the unique keys include at least a MME Mobile Subscriber Identity and MME codes.

9. A network device in a wireless communication system for filtering paging messages in a data packet stream associated with a UE device, the network device comprising:
    a memory configured to store instructions;
    a processor disposed in communication with said memory, wherein said processor upon execution of the instructions is configured to:
        receive a data packet stream having a Paging Message packet from a network node device in the communication system;
        determine an identity of a User Equipment (UE) associated with the received Paging Message packet;
        determine if Paging Message information associated with the determined UE is stored in memory associated with the network monitoring device;
        filter the received Paging Message packet from the received data packet stream in the event stored Paging Message information was determined to be associated with the determined UE in the memory; and
        store information associated with the received Paging Message packet in the memory in the event there is no Paging Message information stored in the memory associated with the determined UE in the memory;
        determine if a predetermined time period has elapsed for storage in the memory of Paging Message information associated with the determined UE; and
        remove the information associated with Paging Message packet from the memory in the event the predetermined time period has elapsed.

10. The network device as recited in claim 9, wherein the controller is further configured to:
    receive a Service Request message in the received data stream packet from a network node device in the communication system;
    determine an identity of a User Equipment (UE) associated with the received Service Request message;
    determine if Paging Message information associated with the determined UE is stored in memory; and
    remove the stored Paging Message information associated with the determined UE device from the memory.

11. The network device as recited in claim 10, wherein the controller is further configured to generate a Key Performance Indicator (KPI) for the determined UE in the event Paging Message information associated with the determined UE was removed from memory.

12. The network device as recited in claim 9, wherein the information associated with the received Paging Message packet in the memory includes MME Mobile Subscriber Identity information.

13. The network device as recited in claim 9, wherein the received Paging Message packet is a downlink S1AP Paging Message packet.

14. The network device as recited in claim 9, when the identity of a User Equipment (UE) associated with the received Paging Message packet message is determined by analysis of unique keys present the received data packet stream.

15. The network device as recited in claim 9, when the unique keys include at least a MME Mobile Subscriber Identity and MME codes.

16. A non-transitory computer readable storage medium and one or more computer programs embedded therein, the computer programs comprising instructions, which when executed by a network node device in a wireless communication system, cause the network monitoring node device to:
    receive a data packet stream having a Paging Message packet from a network node device in the communication system;
    determine an identity of a User Equipment (UE) associated with the received Paging Message packet;

determine if Paging Message information associated with the determined UE is stored in memory;

filter the received Paging Message packet from the received data packet stream in the event stored Paging Message information was determined to be associated with the determined UE;

store the received Paging Message packet in the memory in the event there is no Paging Message information stored in the memory associated with the determined UE;

receive a Service Request message in the received data stream packet from a core network node device in the communication system;

determine an identity of a User Equipment (UE) associated with the received Service Request message;

determine if Paging Message information associated with the determined UE of the Service Request Message is stored in memory to then remove the stored Paging Message information associated with the determined UE from memory.

17. The non-transitory computer readable storage medium as recited in claim 10, wherein the network node device is further caused to generate a Key Performance Indicator for the determined UE in the event Paging Message information associated with the determined UE was removed from the memory.

18. The non-transitory computer readable storage medium as recited in claim 16, wherein the network node device is further configured to:

determine if a predetermined time period has elapsed for storage in the memory of Paging Message information associated with the determined UE; and remove the information associated with the Paging Message packet from the memory in the event the predetermined time period has elapsed.

19. The non-transitory computer readable storage medium as recited in claim 18, wherein the received Paging Message packet is a downlink S1AP Paging Message packet.

20. The non-transitory computer readable storage medium as recited in claim 18, when the identity of a User Equipment (UE) associated with the received Paging Message packet message is determined by analysis of unique keys present the received data packet stream including at least a MME Mobile Subscriber Identity and MME codes.

\* \* \* \* \*